United States Patent [19]

Hubbard

[11] 4,286,424
[45] Sep. 1, 1981

[54] BLOCKAGE DETECTOR FOR A COTTON HARVESTER

[75] Inventor: Arthur L. Hubbard, Ankeny, Iowa
[73] Assignee: Deere & Company, Moline, Ill.
[21] Appl. No.: 139,576
[22] Filed: Apr. 11, 1980
[51] Int. Cl.³ .......................................... A01D 45/18
[52] U.S. Cl. ......................................... 56/10.2; 56/41
[58] Field of Search ........................... 56/10.2, 28–50; 340/684, 608, 665

[56] References Cited

U.S. PATENT DOCUMENTS

| | | | |
|---|---|---|---|
| 828,262 | 8/1906 | Adams | 340/608 |
| 859,147 | 7/1907 | Strodtbeck | 340/608 |
| 3,028,718 | 4/1962 | Hubbard | 56/41 |
| 3,260,040 | 7/1966 | Wilson | 56/41 |
| 3,464,191 | 9/1969 | Copley et al. | 56/133 |
| 3,863,428 | 2/1975 | Baxter | 56/10.2 |

Primary Examiner—Robert A. Hafer

[57] ABSTRACT

A system for detecting a blockage in the cotton conveying system for a harvesting unit on a cotton harvester. An upright flexible flap assembly is connected to a post or wall adjacent an upright doffing mechanism of the harvesting unit. A normally-open switch member is slightly offset from the flap. If a blockage occurs in the duct or discharge structure, cotton will begin building up near the doffing mechanism and will be pushed against the flap. The flap in turn contacts the switch member, which closes a circuit and provides a warning to the operator so the harvester can be stopped before the blockage causes serious damage to the harvesting unit.

10 Claims, 6 Drawing Figures

BLOCKAGE DETECTOR FOR A COTTON HARVESTER

BACKGROUND OF THE INVENTION

The present invention relates generally to a cotton conveying system for a cotton harvester, and more specifically to a blockage detector for such a system.

Typical of cotton harvesters, harvesting units are supported forwardly of a main frame. Each harvesting unit includes a plant passage for receiving a row of cotton and a pair of upright picker drums supported adjacent the plant passage. Spindles on the drums extend into the passage and remove cotton from the plants, and upright doffer assemblies doff the cotton from the spindles and direct it through discharge openings into upright discharge structure or suction doors. The cotton is then removed from the discharge structure or suction doors by cotton conveying ducts which carry air jet nozzles to propel the cotton into a basket on the harvester. Frequently, debris in the area of the discharge openings, or a blockage in the discharge structure or conveying ducts, will cause a build-up of cotton near the doffer assemblies. If undetected, this build-up of cotton can cause serious damage to the harvesting unit. Fires can occur in the doffer area because of the friction between the build-up of cotton and the doffer assemblies.

Heretofore systems for detecting blockage have not been entirely satisfactory. Some systems utilizing differential air pressure resulting from cotton build-up or debris in the duct or discharge structure are very sensitive and expensive to build, and have not solved the problem of detecting a partial blockage near the doffer assemblies. Others use a sensitive thermistor bridge which senses an interruption in air flow. Bridge-type sensors must be carefully adjusted prior to the harvesting operation. Photocell systems have also been utilized to detect absence of cotton in a duct, but they often give false indications at the end of a row and are easily disabled by sap or dust blocking the light path.

BRIEF DESCRIPTION OF THE INVENTION

It is therefore an object of the present invention to provide an improved system for detecting a blockage in the cotton conveying system of a cotton harvester.

It is yet another object to provide an improved system for detecting a blockage or build-up of a crop near a rotating member of a harvesting unit.

It is another object of the present invention to provide a system for detecting a build-up of cotton near the doffing assembly of a harvesting unit on a cotton harvester. It is still another object to provide such a system which is relatively simple and easy to manufacture and adjust, and yet is very reliable. It is yet another object to provide such a system which is sensitive to a partial blockage in the doffer area.

It is a further object of the present invention to provide an inexpensive and reliable blockage detecting system for a cotton harvester which does not require careful adjustment and which is substantially immune to dirt and sap.

In accordance with the above objects, an upright resilient flap assembly is carried by the harvesting unit adjacent the doffing assembly. A contact is secured to the unit slightly offset from a metal strip on the flap. If cotton begins to build up in the doffer area, the flap will be urged toward the contact. When the metal strip grounds the contact, an alarm circuit is activated to alert the operator of the build-up of cotton.

The device is very simple and yet highly effective for detecting even partial blockages and build-ups of cotton in the doffer area. No complex adjustments are required, and false alarms are substantially eliminated.

These and other objects, features and advantages of the present invention will become apparent to those skilled in the art from the description of the preferred embodiment which follows and from the drawings.

DESCRIPTION OF THE PREFERRED EMBODIMENT

Figure 1:
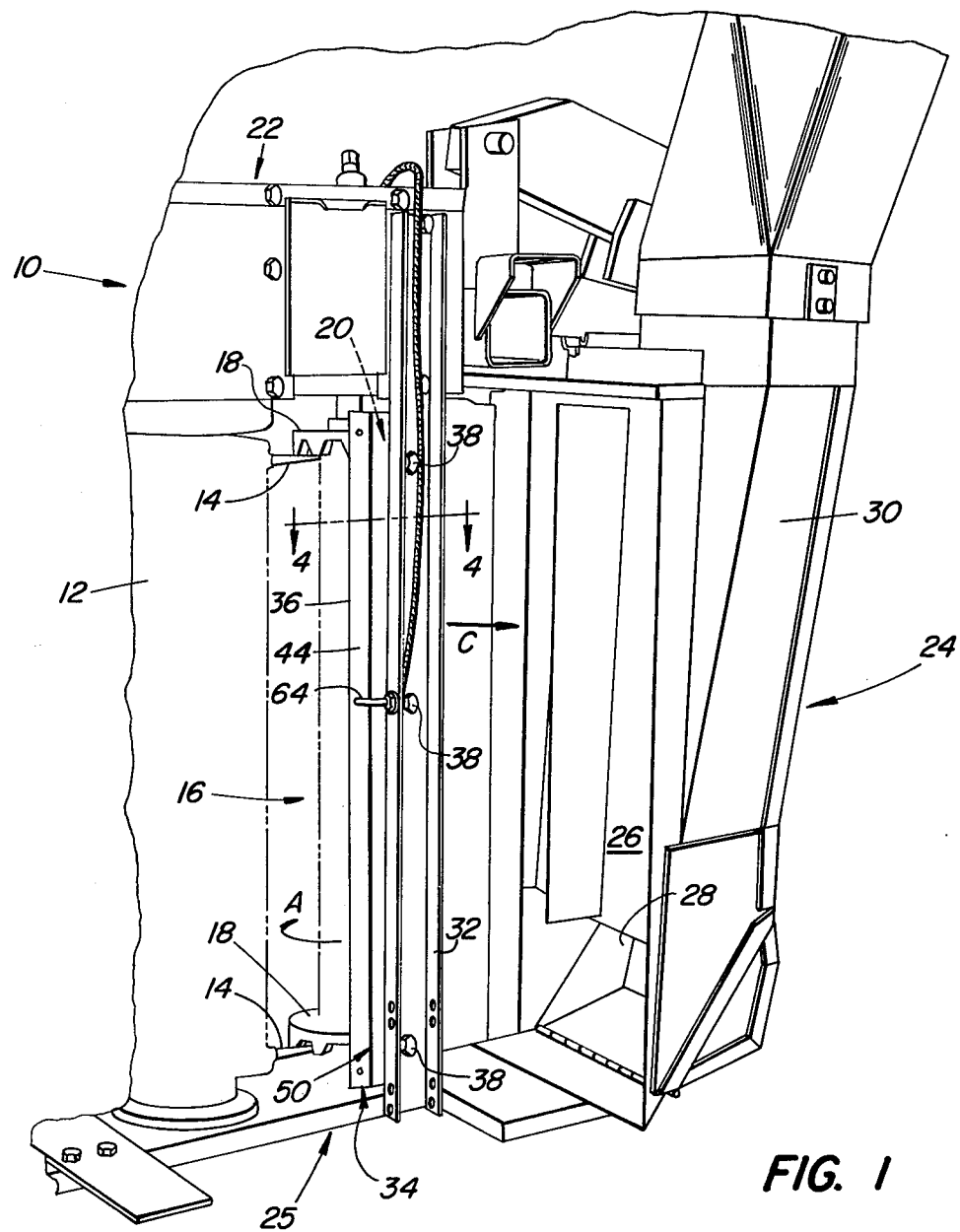
FIG. 1 is a perspective view of a portion of the front of a cotton harvester with one of the harvesting units removed to show the upright doffer flap of the present invention.

Referring now to FIG. 1, therein is shown a portion of a cotton harvester. The cotton harvester includes an upright harvesting unit 10 of generally conventional design with a pair of spindle drums 12 located on opposite sides of a plant passage which receives a row of cotton. Spindles 14 on the drums 12 extend into the passage and remove cotton from the plants.

An upright doffer assembly 16 with doffer pads 18 removes the cotton from the spindles 14 and propels it rearwardly along a path indicated generally at arrow C through an upright discharge opening 20. The doffer assembly 16 and spindle drum 12 are supported in the unit 10 between an upper box-like structure 22 and a lower frame 25, and are driven by a conventional gear assembly (not shown) located within the structure 22.

An upright suction door structure 24 is supported by the unit 10 and opens into the opening 20 to receive the cotton propelled rearwardly from the doffer assembly 16. The cotton strikes a rear panel 26 of the door structure and drops to an opening 28. The cotton is sucked through the opening 28 and into a duct 30 as an air stream is directed upwardly in the duct by a nozzle (not shown). If a more detailed description of the cotton harvester and its operation is desired, reference may be had to co-pending application Ser. No. 100,317, entitled "Cotton Harvester" filed Dec. 5, 1979 and assigned to the assignee of the present invention. However, it is to be understood that the present invention may be used with various other types of harvesting units having rotating harvesting assemblies.

An upright structural member 32, which as shown in FIG. 1 is a channel-shaped beam, extends between the upper structure 22 and the lower frame 25 parallel to the axis of the doffer assembly 16. The member 32 is offset from the doffer assembly 16 and supports an upright doffer flap assembly 34 which includes a forwardly and inwardly extending edge 36. The assembly 34 is connected to the member 32 by bolts 38 or other suitable fasteners. The edge 36 of the flap assembly 34 projects generally in the direction of rotation of the doffer 16 as indicated by the arrow A.

Figure 2:
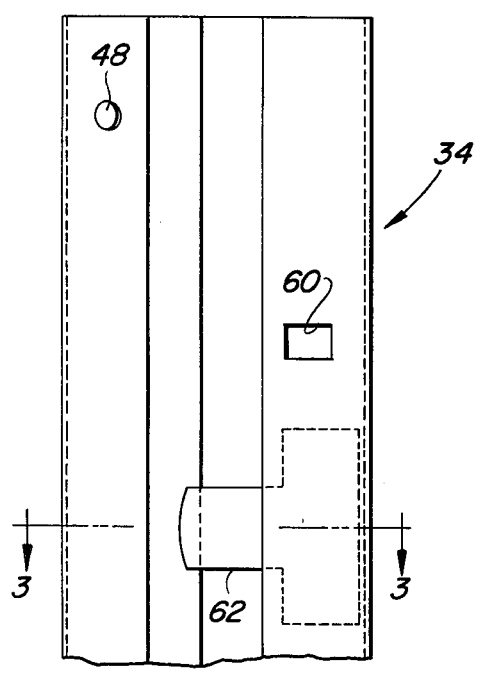
FIG. 2 is a front view of the doffer flap shown in FIG. 1.
Figure 3:
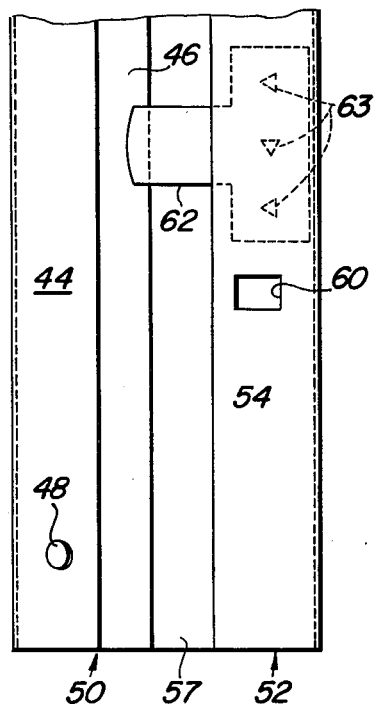
FIG. 3 is a top view of the doffer flap as seen along the line 3—3 in FIG. 2.
Figure 3:
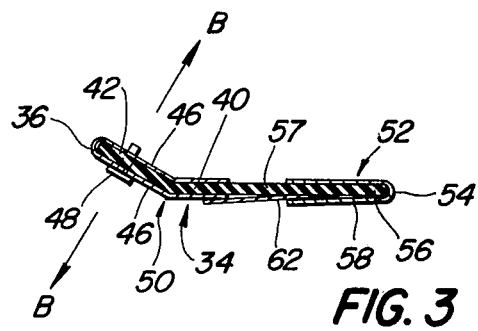

As best seen in FIGS. 2 and 3, the flap assembly 34 includes an elongated strip 40 of resilient material, preferably neoprene. The length of the strip 40 is substantially greater than its width and is approximately equal to the height of the doffer 16. Clamped around a leading edge 42 of the strip 40 is a generally U-shaped forward sheath 44 preferably formed from sheet metal of sufficient strength to compress the strip 40 within leg portions 46. Rivets 48 or the like, in addition, secure the sheath 44 to the leading edge 42.

The leg portions 46 are bent at 50 so that the plane of the leading edge 36 of the flap assembly 34 extends obliquely to the plane of rear connecting portion 52.

A U-shaped rear sheath 54 is clamped around rear portion 56. The sheath 54 is also formed from sheet metal of sufficient strength to compress the rear portion 56 between leg portions 58. Holes 60 in the sheath 54 and the rear portion 56 receive the bolts 38 (FIG. 1) which secure the flap assembly to the member 32 and, in addition, help secure the rear sheath 54 to the rear portion 56 of the strip 40.

Figure 4:
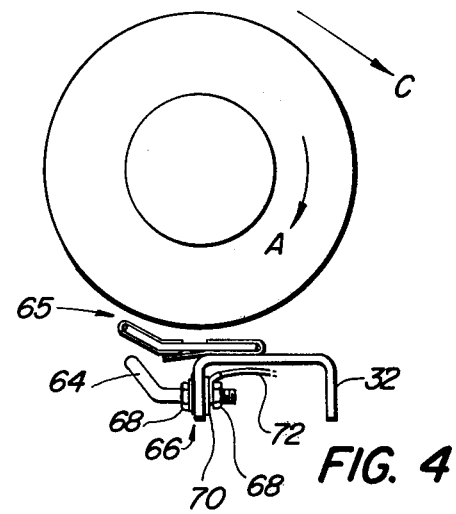
FIG. 4 is a view taken substantially along the line 4—4 of FIG. 1 and showing the location of the contact in relation to the doffer flap when no blockage is present.

The unclamped middle portion 57 of the strip 40 allows the forward sheath 44 to flex back and forth with respect to the rear sheath 54, as indicated by the arrows B in FIG. 3. To maintain electrical contact between the sheaths 44 and 54, and to maintain the desired shape of flap assembly as shown in FIG. 3, a pair of metal spring clips 62 are sandwiched between one leg portion 58 of the sheath 54 and extend forwardly over the corresponding leg portion 46 of the opposite sheath 44. The clips 62 are flat and T-shaped. The top of the "T" includes barbs 63 pressed against the strip 40 under the leg portion 58 to hold the clip 62 in position adjacent the hole 60. The base of the "T" extends across the middle portion of the strip 40 and over the leg portion 46. The clips 62 bias the sheath 44 toward the doffer and help maintain the desired flap assembly shape wherein a narrow upright gap or opening 65 as viewed in FIG. 4 is provided between the forward sheath 44 and the doffer pads 18. The clips 62 also electrically ground the forward sheath 44 to the harvester frame through the rear sheath 54 which is in contact with the member 32.

Connected to the front side of the channel member 32 and extending inwardly toward the forward sheath 44 is a threaded rod-like contact 64 bent off-axis near its forward end. The contact is secured to but electrically insulated from the member 32 by a conventional insulated bushing assembly 66 including a pair of nylon stepped washers compressed between a pair of nuts 68 threaded on the contact 64. The distance between the contact 64 and the sheath 44 is adjustable by loosening the nuts 68 and rotating the contact 64 in the bushing assembly 66. The offset end of the contact 64 can be adjusted forwardly or rearwardly by changing the position of the nuts 68 with respect to the contact 64.

A terminal 70, connected to a wire 72, is secured between the bushing assembly 66 and the nut 68. When the forward sheath 44 engages the contact 64, the terminal 70 is grounded to the frame of the harvester. The flap assembly 34 and the contact 64 form a normally open switch between the terminal 70 and the implement frame which closes when the sheath 44 is urged against the bias of the spring clips 62 and neoprene strip 40 into engagement with the contact 64.

Figure 5:
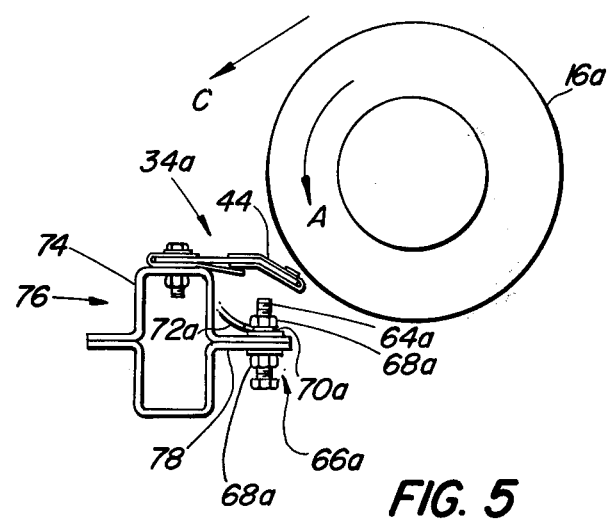
FIG. 5 is a view similar to that shown in FIG. 4 but showing the doffer flap and contact on the side of the harvesting unit opposite that shown in FIG. 1.

FIG. 5 shows a flap assembly 34a connected near an outer rear doffer 16a to inner post 74 of a double-channel post assembly 76. The contact 64a is straight rather than bent and extends transversely through forward flanges 78 of the post assembly 76. A bushing assembly 66a which includes a pair of nylon stepped washers insulates the contact from the frame. The contact 64a, which preferably is an ordinary threaded bolt, is adjustably secured in position by two nuts 68a. By changing the location of the nuts 68a with respect to the bolt, the distance between the contact 64a and the sheath 44 can be adjusted. A terminal 70a is connected to a wire 72a and is grounded whenever the sheath 44 is urged against the contact 64a.

Figure 6:
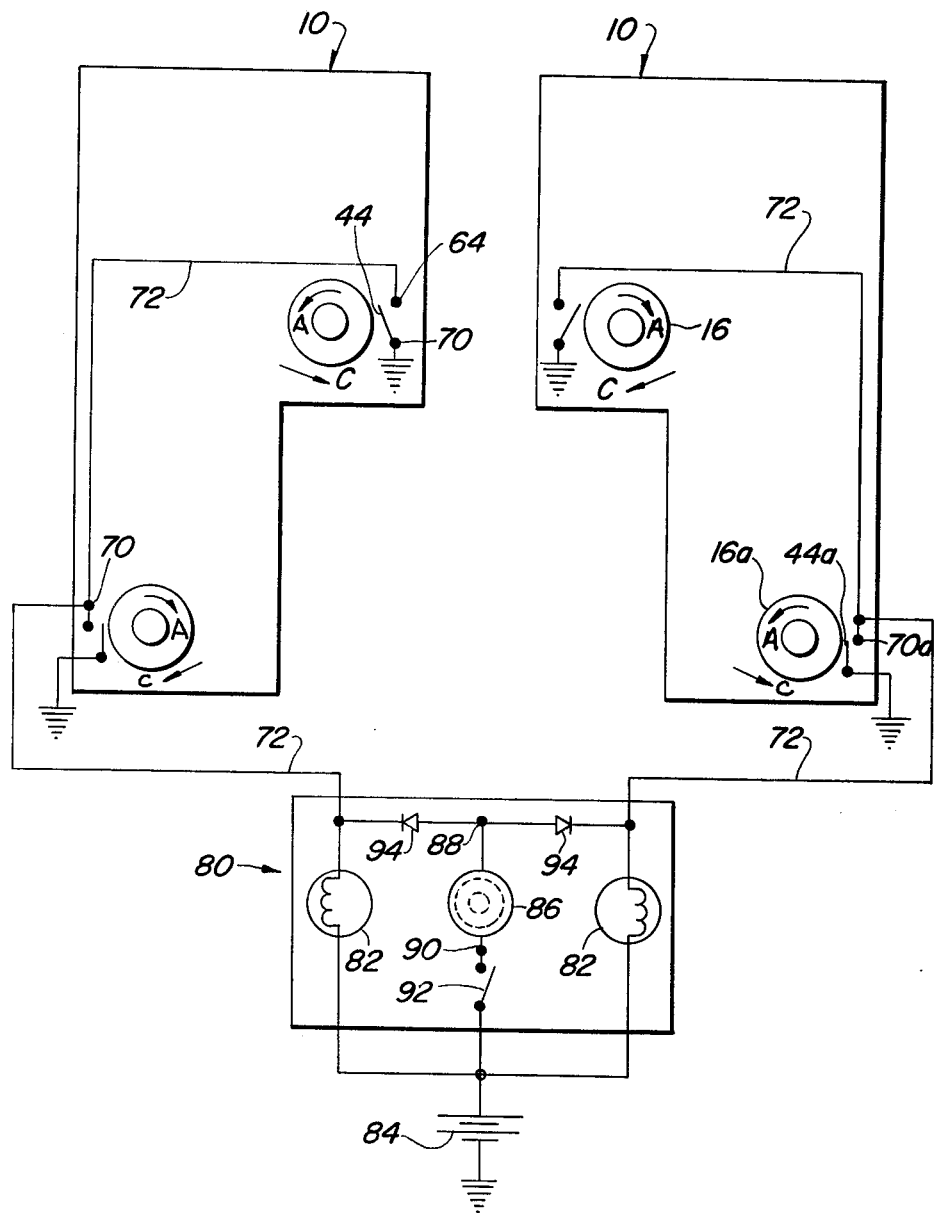
FIG. 6 is a schematic diagram of the warning circuit.

Under normal operation the doffer pads 18, rotating in the direction of the arrow A, doff the cotton from the spindles 14 and propel it generally along the path indicated by the arrow C into the suction door structure 24 where it is removed through the opening 28 by the duct 30. If a blockage occurs in the duct or suction door, or for some other reason the cotton begins to build up adjacent the doffer, the doffer pads 18 will begin to carry the cotton in the direction of rotation A beyond the normal path C toward the flap assembly 34. The doffer directs the cotton into the gap 63 against the forward sheath 44. The sheath 44 is urged against the bias of the spring clips 62 and neoprene strip 40 into engagement with the contact 64 to ground the terminal 70. The terminal 70 is connected via the wire 72 to an alarm circuit 80 in the harvester cab. An indicator lamp 82, located on an instrument panel in the harvester cab, is connected between the terminal 70 and the positive terminal of a battery 84 or other power source on the harvester. The negative terminal of the battery 84 is connected to the harvester frame so that when the sheath 44 engages the contact 64, current will flow from the positive terminal through the lamp 82 to visually indicate to the operator that a blockage has occurred. As seen in FIG. 6, only one lamp 82 is provided for each pair of doffer assemblies 16 in a harvesting unit 10. The pair of doffer assembly switches formed by the flap assemblies 34 and the contacts 64 are connected in parallel between the wires 72 and the frame so that if either of the switches is closed, the lamp 82 for the particular harvesting unit will light. Alternatively, a lamp can be provided for each doffer assembly.

A horn 86 having a pair of terminals 88 and 90 provides an audible signal to the operator when a sheath 44 engages the contact 64 in any of the monitored harvesting units 10. The terminal 90 is connected through an on-off switch 92, located on the instrument panel to the positive terminal of the battery 84. The terminal 88 is connected through diodes 94 to the wires 72, so that when the switch 92 is in the "on" position and any of the terminals 70 are grounded, current will pass through the horn 86 and the diode 94 to sound the horn and alert the operator that one of the harvesting units 10 is blocked. The lamp 82 indicates which of the units 10 is blocked. The operator can turn the switch 92 to the "off" position to disable the alarm, but the indicator lamp 82 will remain on until the blockage is removed from the corresponding doffer assembly area and the sheath 44 disengages the contact 64. Two harvesting units 10 are shown in FIG. 6 by way of example only, and as many wires 72, lamps 82 and diodes 94 can be provided as there are harvesting units. A four row cotton harvester, for example, would have four wires 72 connected to eight respective terminals 70, and four indicator lamps 82 and diodes 94 would be connected to the wires 72.

Having described the preferred embodiment, it will become apparent to those skilled in the art that various modifications can be made without departing from the scope of the claims which follow.

I claim:

1. In a cotton harvester having a harvesting unit defining an upright discharge opening, a harvesting mechanism carried by the harvesting unit including rotatable doffer means for directing a flow of harvested cotton along a path between the doffer means and the discharge opening, a warning system comprising: a movable flap connected to the harvesting unit adjacent the doffer means and offset from the path, said flap biased toward a first position and shiftable from said first position to a second position by the cotton as the flow deviates from the path and the cotton impinges against the flap; and means responsive to the movement of the flap for providing a signal when the flap is shifted to the second position.

2. The invention as set forth in claim 1 wherein the flap and the doffer means define a gap offset forwardly in the direction of doffer rotation from the path, and wherein the deviation in cotton flow from the path directs cotton into the gap and against the flap to shift the flap to the second position.

3. The invention as set forth in claims 1 or 2 further comprising an electrical contact supported adjacent the flap, and wherein the flap includes an electrical conductor engaging the contact when the flap is in the second position.

4. In a cotton harvester having a harvesting unit, a harvesting mechanism carried by the harvesting unit including a rotating doffer for directing cotton away from the harvesting mechanism, and cotton conveying means for removing the cotton from the harvesting unit, and wherein a blockage in the harvesting unit or cotton conveying means causes a build-up of cotton near the doffer, a warning system comprising:

a flexible elongated flap assembly connected to the unit adjacent the doffer and having a major axis generally parallel to the axis of rotation of the doffer, said flap including a forward edge extending generally in the direction of rotation of the doffer and means for biasing the forward edge toward the doffer, wherein build-up of cotton near the doffer is urged toward the forward edge by the rotation of the doffer thereby biasing the edge away from the doffer; and first means responsive to the biasing of the edge away from the doffer for providing a signal indicating the build-up of cotton near the doffer.

5. The invention as set forth in claim 4 wherein the first means includes an electrically activated indicator, a power source, and switch means connected between the source and the indicator and responsive to the movement of the edge for activating the indicator when the forward edge is biased away from the doffer.

6. The invention as set forth in claim 5 wherein the switch means includes a conductor attached to the flap and a contact supported by the unit adjacent the flap outwardly of the doffer so that upon movement of the forward edge away from the doffer, the conductor contacts the contact.

7. In a crop harvester having rotating crop contacting means for directing the crop along a first path towards a discharge structure wherein said path is generally tangential to a path described by the rotating crop contacting means, an indicator comprising:

a flap located adjacent the rotating means, said flap offset from the first path in the direction of rotation of the rotating means and biased towards a first position, said flap movable away from the first position towards a second position by a change in direction of crop flow away from the first path and towards the flap; and means responsive to the movement of the flap towards the second position for providing an indication of the change in direction of the crop flow.

8. The invention as set forth in claim 7 wherein the flap is elongated in a direction generally parallel to the axis of rotation of the rotating means and includes first and second edge portions, a resilient center section connecting the edge portions, and means securing the first edge portion to the crop harvester wherein the second edge portion is offset from the crop contacting means and defines a gap therewith, and wherein the second edge portion is urged away from the crop contacting means against bias of the resilient center section as the crop is carried by the crop contacting means in the direction of rotation into the gap.

9. The invention as set forth in claim 8 further comprising a spring member connected between the edge portions and biasing the second edge portion towards the crop contacting means.

10. The invention as set forth in claims 8 or 9 wherein the means responsive to the movement of the flap includes a contact member offset from the flap when the flap is in the first position and contacting the flap as it moves toward the second position.

* * * * *